United States Patent
Baughman et al.

(10) Patent No.: US 10,868,799 B2
(45) Date of Patent: Dec. 15, 2020

(54) MINIMIZING RISK OF LOSING INFORMATION SENT OVER A NETWORK

(71) Applicant: International Business Machines Corporation, Armonk, NY (US)

(72) Inventors: Aaron K. Baughman, Silver Spring, MD (US); Diwesh Pandey, Bangalore (IN); John P. Perrino, Hedgesville, WV (US); Todd R. Whitman, Bethany, CT (US)

(73) Assignee: International Business Machines Corporation, Armonk, NY (US)

( * ) Notice: Subject to any disclaimer, the term of this patent is extended or adjusted under 35 U.S.C. 154(b) by 323 days.

(21) Appl. No.: 16/037,154

(22) Filed: Jul. 17, 2018

(65) Prior Publication Data

US 2020/0028824 A1    Jan. 23, 2020

(51) Int. Cl.
    *H04L 29/06* (2006.01)
    *H04L 9/32* (2006.01)

(52) U.S. Cl.
    CPC ........ *H04L 63/0428* (2013.01); *H04L 9/3231* (2013.01)

(58) Field of Classification Search
    None
    See application file for complete search history.

(56) References Cited

U.S. PATENT DOCUMENTS

| | | | |
|---|---|---|---|
| 5,796,948 A | 8/1998 | Cohen | |
| 7,289,949 B2 | 10/2007 | Warner et al. | |
| 8,561,127 B1 | 10/2013 | Agrawal et al. | |
| 9,754,219 B1 * | 9/2017 | Brestoff | G06F 40/40 |
| 10,004,451 B1 * | 6/2018 | Proud | A61M 21/02 |
| 10,058,290 B1 * | 8/2018 | Proud | G16H 40/67 |
| 2005/0005266 A1 * | 1/2005 | Datig | G06N 5/02 |
| | | | 717/136 |

(Continued)

OTHER PUBLICATIONS

R, Vinayakumar et al. Long short-term memory based operation log anomaly detection. 2017 International Conference on Advances in Computing, Communications and Informatics (ICACCI). https://ieeexplore.ieee.org/stamp/stamp.jsp?tp=&arnumber=8125846 (Year: 2017).*

(Continued)

*Primary Examiner* — Jeremiah L Avery
(74) *Attorney, Agent, or Firm* — Robert A. Voigt, Jr.; Winstead PC

(57) ABSTRACT

A method, system and computer program product for securing data transmission. After determining that a message is being created to be sent from a sender to a receiver, the cognitive states of the sender and receiver are measured. A set of feature vectors for the sender and receiver is generated based on the cognitive states of the sender and receiver. The feature vectors are inputted into a long short term memory network, which selects an appropriate level of encryption (encryption strength, encryption algorithm, and mode of transportation in sending the message) to encapsulate the message utilizing the generated set of feature vectors. The message is then encapsulated using the selected level of encryption. In this manner, by using an appropriate level of encryption, the message is less likely to be accessible by unauthorized users thereby reducing the likelihood of unauthorized access or loss of valuable data.

20 Claims, 5 Drawing Sheets

(56) References Cited

U.S. PATENT DOCUMENTS

| | | | |
|---|---|---|---|
| 2006/0005017 A1 | 1/2006 | Black et al. | |
| 2009/0063992 A1 | 3/2009 | Gandhi et al. | |
| 2009/0132275 A1* | 5/2009 | Jung | A61B 5/163 |
| | | | 705/2 |
| 2013/0133026 A1* | 5/2013 | Burgess | H04L 12/66 |
| | | | 726/1 |
| 2014/0114899 A1 | 4/2014 | Wan et al. | |
| 2014/0257047 A1 | 9/2014 | Sillay et al. | |
| 2015/0096002 A1* | 4/2015 | Shuart | G06F 21/32 |
| | | | 726/7 |
| 2015/0180746 A1 | 6/2015 | Day, II et al. | |
| 2016/0104486 A1* | 4/2016 | Penilla | G10L 15/005 |
| | | | 704/232 |
| 2018/0232571 A1* | 8/2018 | Bathiche | G06K 9/00369 |

OTHER PUBLICATIONS

Kong, Weicong et al. Short-Term Residential Load Forecasting Based on Resident Behaviour Learning. IEEE Transactions on Power Systems, vol. 33, Issue: 1. https://ieeexplore.ieee.org/stamp/stamp.jsp?tp=&arnumber=7887751 (Year: 2018).*

Lee et al., "The Influence of Emotion on Keyboard Typing: An Experimental Study Using Auditory Stimuli," PLoS One, vol. 10, No. 6, Jun. 11, 2015, pp. 1-16.

Dietz et al., "A Practical Pressure Sensitive Computer Keyboard," UIST'09, Oct. 4-7, 2009, Victoria, British Columbia, Canada, pp. 1-4.

Chen et al., "Personalized Keystroke Dynamics for Self-Powered Human-Machine Interfacing," ACS Nano, vol. 9, No. 1, 2015, pp. 105-116, See Abstract.

Clayton EPP, "Identifying Emotional States Through Keystroke Dynamics," Thesis submitted to the College of Graduate Studies and Research, Department of Computer Science, University of Saskatoon, Canada, 2010, pp. 1-145.

Sykes et al., "Affective Gaming: Measuring Emotion Through the Gamepad," CHI'03, Ft. Lauderdale, Florida, USA, 2003, pp. 732-733.

Lv et al., "Biologic Verification Based on Pressure Sensor Keyboards and Classifier Fusion Techniques," IEEE Transactions on Consumer Electronics, vol. 52, No. 3, 2006, pp. 1057-1063.

Poorna Banerjee Dasgupta, "Detection and Analysis of Human Emotions Through Voice and Speech Pattern Processing," International Journal of Computer Trends and Technology (IJCTT), vol. 52, No. 1, Oct. 2017, pp. 1-3.

Morrison et al., "Secure and Connected Telehealth Approach to Mitigating Concussion Risks in Student Athletes," 2016 25th International Conference on Computer Communication and Networks (ICCCN), Aug. 1-4, 2016, Waikoloa, HI, USA, pp. 1-9, See Abstract.

Huang et al., "A Key-chain Based Keying Scheme For Many-to-Many Secure Group Communication," ACM Transactions on Information and System Security, vol. 7, No. 4, Nov. 2004, pp. 1-30.

Anonymous, "Method for Content-Based Document Encryption," IP.Com Disclosure No. IPCOM000197599D, Jul. 15, 2010, pp. 1-5.

* cited by examiner

US 10,868,799 B2

MINIMIZING RISK OF LOSING INFORMATION SENT OVER A NETWORK

TECHNICAL FIELD

The present invention relates generally to cryptography, and more particularly to minimizing risk of losing information sent over a network.

BACKGROUND

In cryptography, encryption is the process of encoding a message or information in such a way that only authorized parties can access it and those who are not authorized cannot. Encryption does not itself prevent interference, but denies the intelligible content to a would-be interceptor. In an encryption scheme, the intended information or message, referred to as plaintext, is encrypted using an encryption algorithm—a cipher—generating ciphertext that can be read only if decrypted. For technical reasons, an encryption scheme usually uses a pseudo-random encryption key generated by an algorithm. It is in principle possible to decrypt the message without possessing the key, but, for a well-designed encryption scheme, considerable computational resources and skills are required. An authorized recipient can easily decrypt the message with the key provided by the originator to recipients but not to unauthorized users.

There are various encryption algorithms that may be used, such as Twofish, Blowfish, Rivset-Shamir-Adleman (RSA), Triple Data Encryption Algorithm (DES) and Advanced Encryption Standard (AES).

The particular type of encryption algorithm, including its strength (referring to the level of security achieved by the cipher), as well as the mode of transportation of the message, may be determined by the user, the system or based on the end-to-end communications. For example, the particular type of encryption algorithm, including its strength, as well as the mode of transportation of the message, may be determined based on the communications between the end nodes of the communication network where the sender of the message and the receiver of the message are located.

However, the selection of the encryption algorithm as well as the selection of the strength of the encryption algorithm and the mode of transportation of the message using such means may not result in the appropriate level of encryption encapsulating the message thereby causing the message to be more easily accessible by unauthorized users resulting in the unauthorized access or loss of valuable data.

SUMMARY

In one embodiment of the present invention, a method for securing data transmission comprises determining that a message is being created to be sent from a sender to a receiver. The method further comprises measuring a cognitive state of the sender of the message. The method additionally comprises measuring a cognitive state of the receiver of the message. Furthermore, the method comprises generating a set of feature vectors for the sender and the receiver based on the cognitive states of the sender and the receiver. Additionally, the method comprises inputting the generated set of feature vectors into a long short term memory network. In addition, the method comprises selecting a level of encryption to encapsulate the message by the long short term memory network utilizing the generated set of feature vectors, where the selected level of encryption comprises an encryption strength, an algorithm and a mode of transportation. The method further comprises encapsulating the message using the selected level of encryption in response to the selected level of encryption to encapsulate the message being capable of being implemented by a computing device of the sender.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, system and computer program product for securing data transmission. In one embodiment of the present invention, after determining that a message is being created to be sent from a sender to a receiver, a cognitive state of the sender and a cognitive state of the receiver are measured. The "cognitive state" of the sender or receiver refers to the thought processes and state of mind of the sender or receiver, such as being distracted, confused, and engrossed. In one embodiment, the cognitive state of the sender may be determined based on the role of the sender, measuring the input speed of typing the message being created, measuring the pressure applied to the keys as the sender is typing the message, measuring the voice characteristics of the sender in creating the message, measuring the social tone and/or acquiring biometric information of the sender during the creation of the message. In one embodiment, the cognitive state of the receiver may be determined based on the role of the receiver, measuring the social media tone and/or acquiring biometric information of the receiver during the time of message transmission. A set of feature vectors for the sender and receiver is generated based on the cognitive states of the sender and receiver. The feature vectors are inputted into a long short term memory network, which selects an appropriate level of encryption to encapsulate the message utilizing the generated set of feature vectors. The appropriate level of encryption refers to the encryption algorithm, the encryption strength and the mode of transportation in sending the message. The message is then encapsulated using the selected level of encryption if the computing device of the sender is capable of implementing the level of encryption. In this manner, by using an appropriate level of encryption, the message is less likely to be accessible by unauthorized users thereby reducing the likelihood of unauthorized access or loss of valuable data.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
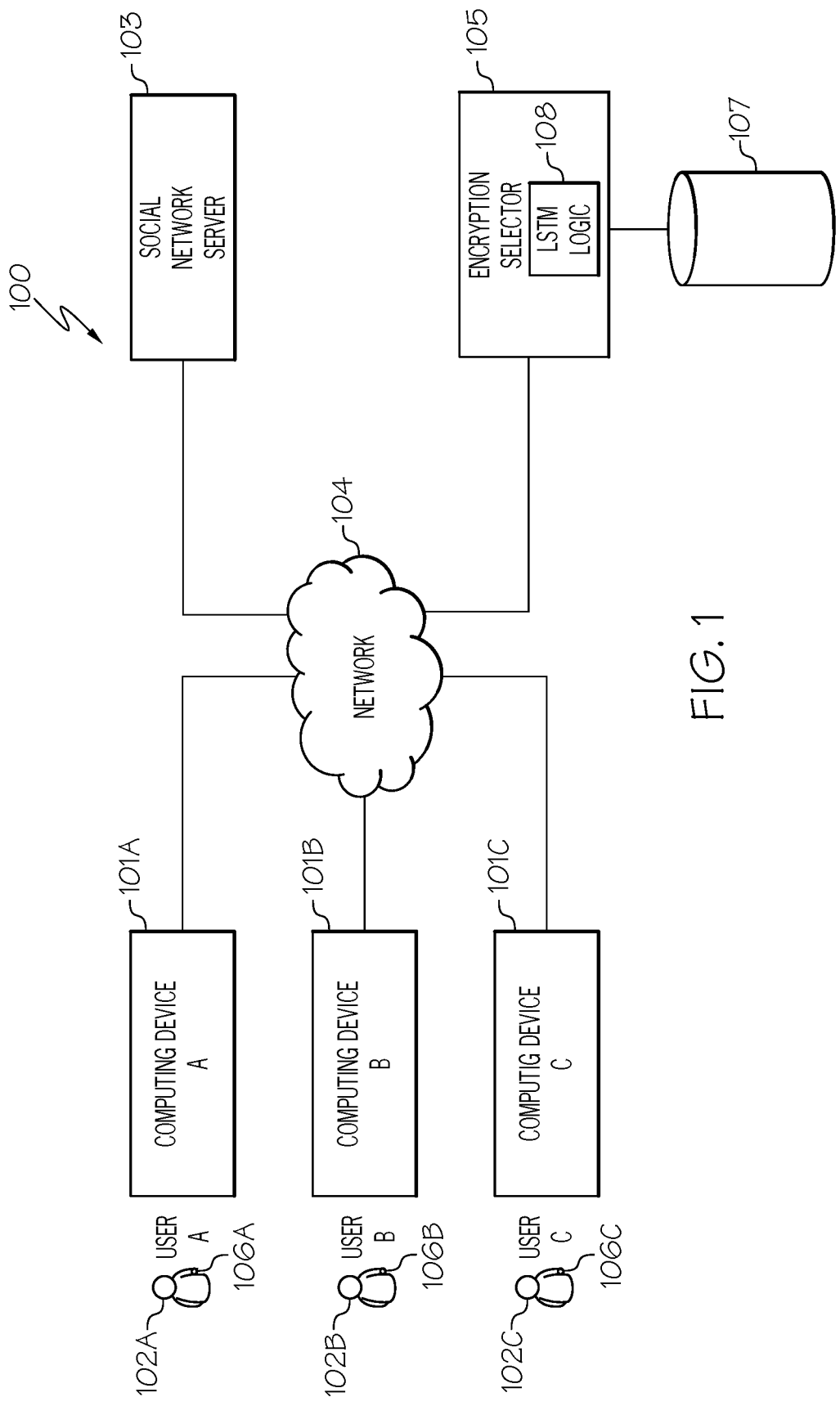
FIG. 1 illustrates a communication system for practicing the principles of the present invention in accordance with an embodiment of the present invention.

Referring now to the Figures in detail, FIG. 1 illustrates an embodiment of the present invention of a communication system 100 for practicing the principles of the present invention in accordance with an embodiment of the present invention. Communication system 100 includes computing devices 101A-101C (identified as "Computing Device A," "Computing Device B," and "Computing Device C," respectively, in FIG. 1) utilized by users 102A-102C, respectively (identified as "User A," "User B," and "User C," respectively, in FIG. 1). Computing devices 101A-101C may collectively or individually be referred to as computing devices 101 or computing device 101, respectively. Furthermore, users 102-102C may collectively or individually be referred to as users 102 or user 102, respectively.

Computing devices 101 are connected to a social network server 103 via a network 104. Computing device 101 may be any type of computing device (e.g., portable computing unit, Personal Digital Assistant (PDA), laptop computer, mobile device, tablet personal computer, laptop computer, smartphone, mobile phone, navigation device, gaming unit, desktop computer system, workstation, Internet appliance and the like) configured with the capability of connecting to network 104 and consequently communicating with other computing devices 101 and social network server 103. A description of the hardware configuration of computing device 101 is provided below in connection with FIG. 3.

Computing devices 101 may be configured to send and receive text-based messages, such as in real-time during an instant messaging session. Any user of computing device 101 may be the creator or initiator of an instant message (message in instant messaging) and any user of computing device 101 may be a recipient of an instant message. Furthermore, any user of computing device 101 may be able to create, receive and send e-mails. Additionally, any user of computing device 101 may be able to send and receive text messages, such as Short Message Services (SMS) messages. The term "messages," as used herein, encompasses each of these types of messages as well as posts to social media websites, such as Facebook®, forums, wikis, etc.

Network 104 may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

Social network server 103, which may be a web server configured to offer a social networking and/or microblogging service, enables users 102 of computing devices 101 to send and read other users' posts. "Posts," as used herein, include any one or more of the following: text (e.g., comments, sub-comments and replies), audio, video images, etc. Social network server 103 is connected to network 104 by wire or wirelessly. While FIG. 1 illustrates a single social network server 103, it is noted for clarity that multiple servers may be used to implement the social networking and/or microblogging service.

System 100 further includes what is referred to herein as an "encryption selector" 105 connected to network 104 by wire or wirelessly. Encryption selector 105 is configured to select the appropriate level of encryption to encapsulate a message being sent from a sender (computing device 101 of user 102 that is sending a message) to a receiver (computing device 101 of user 102 that is receiving the sent message) that minimizes the risk of losing valuable data contained in the message. The "appropriate level of encryption," as used herein, refers to the encryption strength, the encryption algorithm (e.g., Triple DES, RSA, Blowfish) and the mode of transportation in sending the message. "Encryption strength," as used herein, refers to the level of security that a cryptographic primitive, such as a cipher or hash function, achieves. The security level may be expressed in bits, where an n-bit security means that the attacker would have to perform $2^n$ operations to break it. The "mode of transportation," as used herein, refers to the type of transmission, such as Wi-Fi, GSM, wired, etc.

In one embodiment, encryption selector 105 selects the appropriate level of encryption based on the semantic meaning of the content of the message as well as the cognitive states of the sender and receiver and history of security preferences (both sender and receiver). In one embodiment, the semantic meaning of the content of the message may be determined by encryption selector 105 utilizing natural language processing. "Semantic meaning," as used herein, refers to knowing what the collection of words (e.g., words, phrases, sentences) in the message actually means. For instance, it can be inferred that the meaning of the sentence "Bobby hit the ball with a bat" refers to an individual with the name of Bobby hitting a baseball with a baseball bat as opposed to interpreting the message being directed to a bat that is a mammal due to the fact that the words "hit" and "ball" are used in close proximity to the term "bat."

Based on the semantic meaning, an appropriate level of encryption may be determined. For example, a message that involves the topic of an important business issue may be deemed to require a level of encryption involving a high level of security performed by an encryption algorithm difficult to break, where the message is transmitted over a secure network.

"Message," as used herein, refers to an electronic communication, such as e-mail, instant messaging, posts, forum conversations, etc.

The "cognitive state" of the sender or receiver refers to the thought processes and state of mind of the sender or receiver, such as being distracted, confused, and engrossed. In one embodiment, the cognitive state of the sender can be determined based on the role of the sender, measuring the input speed of typing the message being created, measuring the pressure applied to the keys as the sender types the message, measuring the voice characteristics of the sender in creating the message, measuring the social media tone and/or acquiring biometric information of the sender during the creation of the message.

The "role," as used herein, refers to the capacity, position or job of the person, such as being the manager, the chief executive officer or a member of the staff In one embodiment, the role of user 102 (e.g., sender) may be stored in a user profile, which may be stored in a database 107 connected to encryption selector 105. The information about the role of the person may be used in conjunction with other information (e.g., social media tone) to determine the cognitive state of the sender. For example, if the sender is the chief executive officer and creates a message to be sent to an employee with words, such as "action" and "now," then it may be inferred that the cognitive state of mind of the sender is impatience.

In one embodiment, the input speed of typing the message being created can be determined based on software (e.g., typing test software) on computing device 101 of user 102. Such information may be used to determine the cognitive state of mind of the sender. For example, a high typing speed, especially with few spelling errors, may indicate that the sender is engrossed with the creation of the message. A discussion regarding using typing speed to determine the cognitive state of the user is provided in Lee et al., "The Influence of Emotion on Keyboard Typing: An Experimental Study Using Auditory Stimuli," PLoS ONE, Vol. 10, No. 6, Jun. 11, 2015, pp. 1-16.

In one embodiment, the amount of pressure applied to the keys on the keyboard as the sender is typing the message may be determined based on pressure sensors underneath the keys on the keyboard (e.g., Type Cover made by Microsoft®). A discussion regarding such a keyboard is provided in Dietz et al., "A Practical Pressure Sensitive Computer Keyboard," UIST'09, Oct. 4-7, 2009, Victoria, British Columbia, Canada, pp. 1-4. These pressure sensors detect the amount of pressure being applied to the keys of the keyboard which is relayed to a program in computing device 101 of the sender which interprets such information to a state of mind of the sender. A discussion regarding such a program interpreting such information to a state of mind of the sender is provided in Chen et al., "Personalized Keystroke Dynamics for Self-Powered Human-Machine Interfacing," ACS Nano, Vol. 9, No. 1, 2015, pp. 105-116; Clayton Epp, "Identifying Emotional States Through Keystroke Dynamics," Thesis submitted to the College of Graduate Studies and Research, Department of Computer Science, University of Saskatoon, Canada, 2010, pp. 1-145; Sykes et al., "Affective Gaming: Measuring Emotion Through the Gamepad," CHI'03, Ft. Lauderdale, Fla., USA, 2003, pp. 732-733; and Lv et al., "Biologic Verification Based on Pressure Sensor Keyboards and Classifier Fusion Techniques," IEEE Transactions on Consumer Electronics, Vol. 52, No. 3, 2006, pp. 1057-1063. For example, a high level of pressure applied to the keys on the keyboard may indicate that the sender is engrossed with the creation of the message or has a mood of being upset or angry at the time of creating the message.

In one embodiment, the voice characteristics (e.g., pitch, speech rate, number of pauses) of the sender in creating the message is determined based on analyzing the voice signals obtained from a microphone of computing device 101. Such an analysis may be performed via software (e.g., Cogito) in computing device 101 to determine the voice characteristics and infer emotion, such as happiness, sadness, anger, etc. being expressed by the sender based on such voice characteristics. Such an analysis may be used to determine the cognitive state of mind of the sender. For example, if the user expresses anger, then it may be inferred that the cognitive state of mind of the sender is anger or distress. A discussion regarding determining the cognitive state of the user from voice characteristics is provided in Poorna Banerjee Dasgupta, "Detection and Analysis of Human Emotions Through Voice and Speech Pattern Processing," International Journal of Computer Trends and Technology (IJCTT), Vol. 52, No. 1, October 2017, pp. 1-3.

In one embodiment, the social media tone is acquired based on analyzing messages posted by the sender on a social network. "Social media tone," as used herein, refers to the emotion and sentiment expressed by user 102 in a message posted on a social network. In one embodiment, encryption selector 105 determines the social media tone based on analyzing messages posted by the sender on a social network using natural language processing. For example, the tone may be inferred based on the particular terms used in the posts which may convey a particular type of emotion or sentiment. For example, words, such as happy and good, may convey a positive sentiment; whereas, words, such as bad or unhappy, may convey a negative sentiment. Such an analysis may be used to determine the cognitive state of mind of the sender. For example, if the user expresses happiness, then it may be inferred that the cognitive state of mind of the sender is happiness.

Furthermore, in one embodiment, biometric information of the sender may be acquired during the creation of the message from a smart wearable 106A-106C (e.g., smartwatch) worn by user 102A-102C, respectively, such as on the user's wrist. Smart wearables 106A-106C may collectively or individually be referred to as smart wearables 106 or smart wearable 106, respectively. In one embodiment, smart wearable 106 is configured to monitor the user's heart rate, the user's body temperature, levels of a user's sweat, etc. Such monitored information may be transmitted to computing device 101, such as via network 104. Such monitored information is one of the means for monitoring the user's current cognitive state. For example, a high heart rate may indicate anger or strong engagement; whereas, a low heart rate may indicate relaxation. In another example, excessive sweating may indicate nervousness or anxiety. Such information may be used to determine the cognitive state of mind of the sender.

In one embodiment, the cognitive state of the receiver may be determined based on the role of the receiver, measuring the social media tone and/or acquiring biometric information of the receiver during the time of message transmission.

As discussed above, the "role," as used herein, refers to the capacity, position or job of the person, such as being the manager, the chief executive officer or a member of the staff. In one embodiment, the role of user 102 (e.g., receiver) may be stored in a user profile, which may be stored in database 107. The information about the role of the person may be used in conjunction with other information (e.g., social media tone) to determine the cognitive state of the receiver. For example, if the receiver is the chief executive officer and has been posting messages on a social network with words, such as "action" and "now," then it may be inferred that the cognitive state of mind of the receiver is impatience.

Furthermore, in one embodiment, encryption selector 105 determines the social media tone based on analyzing messages posted by the receiver on a social network using natural language processing. For example, as discussed above, the tone may be inferred based on the particular terms used in the posts which may convey a particular type of emotion or sentiment. For example, words, such as happy and good, may convey a positive sentiment; whereas, words, such as bad or unhappy, may convey a negative sentiment. Such an analysis may be used to determine the cognitive state of mind of the receiver. For example, if the user expresses happiness, then it may be inferred that the cognitive state of mind of the receiver is happiness.

Additionally, biometric information of the receiver may be acquired from a smart wearable 106, such as on the user's wrist, during the time of message transmission. As discussed above, in one embodiment, smart wearable 106 is configured to monitor the user's heart rate, the user's body temperature, levels of a user's sweat, etc. Such monitored information may be transmitted to computing device 101, such as via network 104. Such monitored information is one of the means for monitoring the user's current cognitive state. For example, a high heart rate may indicate anger or strong engagement; whereas, a low heart rate may indicate relaxation. In another example, excessive sweating may indicate nervousness or anxiety. Such information may be used to determine the cognitive state of mind of the receiver.

Based on the cognitive states of the sender and receiver, an appropriate level of encryption may be determined. For example, if the cognitive states of both the sender and receiver are urgency and high anxiety, then it may be deemed appropriate to encapsulate the message with a level of encryption involving a high level of security performed by an encryption algorithm difficult to break, where the message is transmitted over a secure network. In another example, if the cognitive states of both the sender and receiver are relaxation and disinterest, then it may be deemed appropriate to encapsulate the message with an encryption algorithm involving a low level of security, where the message may be transmitted over a network with a low security standard.

Furthermore, as discussed above, encryption selector 105 may select the appropriate level of encryption based at least in part on the history of security preferences (for both the sender and the receiver). Such security preferences may be stored in a database 107 connected to encryption selector 105. Such information may be used to determine the appropriate level of encryption. In one embodiment, security preferences may be directly provided by the sender and/or receiver. For example, the sender and/or receiver may input such information in a profile maintained by encryption selector 105 in database 107. Alternatively, security preferences may be indirectly provided by the sender and/or receiver. For example, encryption selector 105 may monitor the modes of transportation used in sending/receiving messages as well as the encryption algorithms utilized by the sender/receiver. Such information may be stored in database 107. The security preferences may be used by encryption selector 105 to determine an appropriate level of encryption. For example, if the sender and receiver tend to utilize an encryption algorithm with a high level of security and transmit messages over a highly secure network, even pertaining to messages involving trivial matters, then it will be more likely that encryption selector 105 will select a level of encryption to encapsulate the message using an encryption algorithm involving a high level of security, where the message is transmitted over a network with a high security standard.

A discussion regarding the types of information stored in database 107 is discussed below in connection with FIG. 2.

Figure 2:
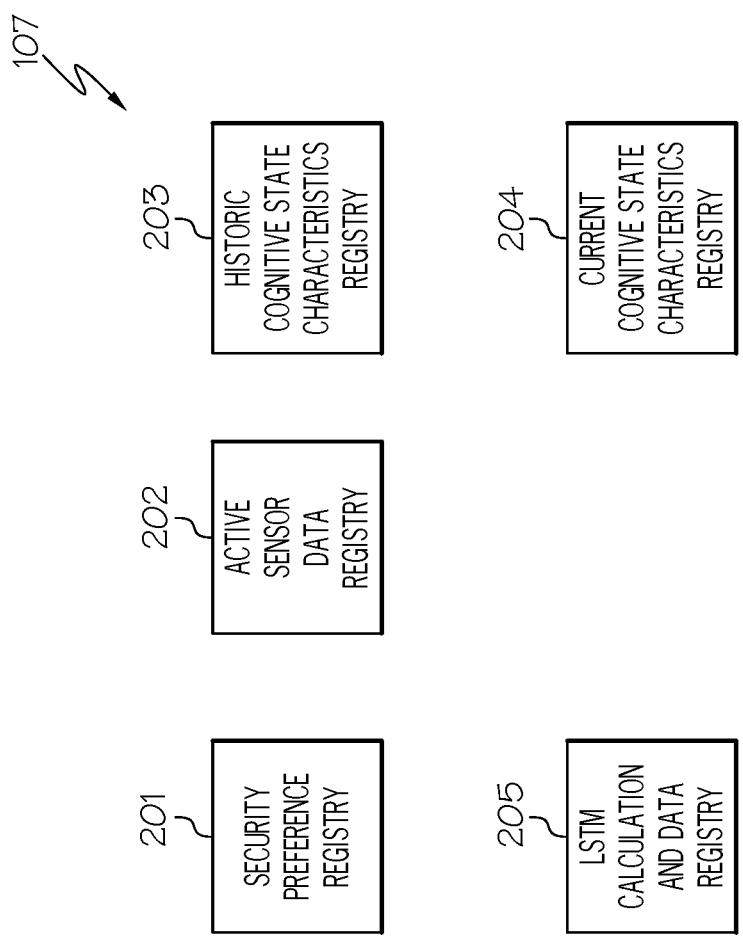
FIG. 2 illustrates the types of information stored in the database in accordance with an embodiment of the present invention.

FIG. 2 illustrates the types of information stored in database 107 in accordance with an embodiment of the present invention. Referring to FIG. 2, in conjunction with FIG. 1, database 107 includes a security preference registry 201 configured to store the security preferences (for both the sender and the receiver) as discussed above.

Database 107 may also include an active sensor data registry 202 configured to store the biometric information for the sender and receiver as discussed above.

Additionally, database 107 may include a historic cognitive state characteristics registry 203 configured to store the historical cognitive state characteristics of the sender and receiver. Database 107 may also include a current cognitive state characteristics registry 204 configured to store the current cognitive state characteristics of the sender and receiver. Such information in registries 203, 204 may be used to determine the current cognitive state of the sender and receiver.

Furthermore, database 107 may include a long short term memory (LSTM) calculation and data registry 205. As discussed in further detail below, encryption selector 105 may utilize LSTM logic 108 to generate a LSTM neural network to select an appropriate level of encryption based on inputting to the LSTM neural network a set of feature vectors that are generated based on the cognitive states of the sender and receiver, the semantic meaning of the content of the message and/or the history of security preferences (for both the sender and the receiver). Such outputs from the LSTM neural network may be stored in registry 205. In one embodiment, the LSTM neural network includes memory cells to recall a current status of encryption attacks and likelihood of losing data over particular modes of transportation. Since cyberattacks are always evolving, the LSTM neural network continuously learns. A further discussion regarding the utilization of the LSTM neural network is provided further below.

Returning to FIG. 1, encryption selector 105 determines whether the selected level of encryption to encapsulate the message can be implemented based, at least in part, on the encryption capability of the sending device (computing device 101 of sender). If the sending device (computing device 101 of the sender) cannot meet the selected level of encryption (i.e., cannot run the selected encryption algorithm with the selected encryption strength and transmit the message over the selected mode of transportation), then encryption selector 105 issues a warning notification indicating that appropriate encryption controls cannot be met for the content of the message. In this manner, a message that may be vulnerable to be accessible by an unauthorized user may be prevented thereby preventing the unauthorized access or loss of valuable data.

A description of the hardware configuration of encryption selector 105 is provided further below in connection with FIG. 4.

System 100 is not to be limited in scope to any one particular network architecture. System 100 may include any number of computing devices 101, users 102, social network servers 103, networks 104, encryption selectors 105, smart wearables 106 and databases 107. Furthermore, while FIG. 1 illustrates encryption selector 105 as being a separate physical device, some or all of the functionality of encryption selector 105 may reside in computing device 101.

Figure 3:
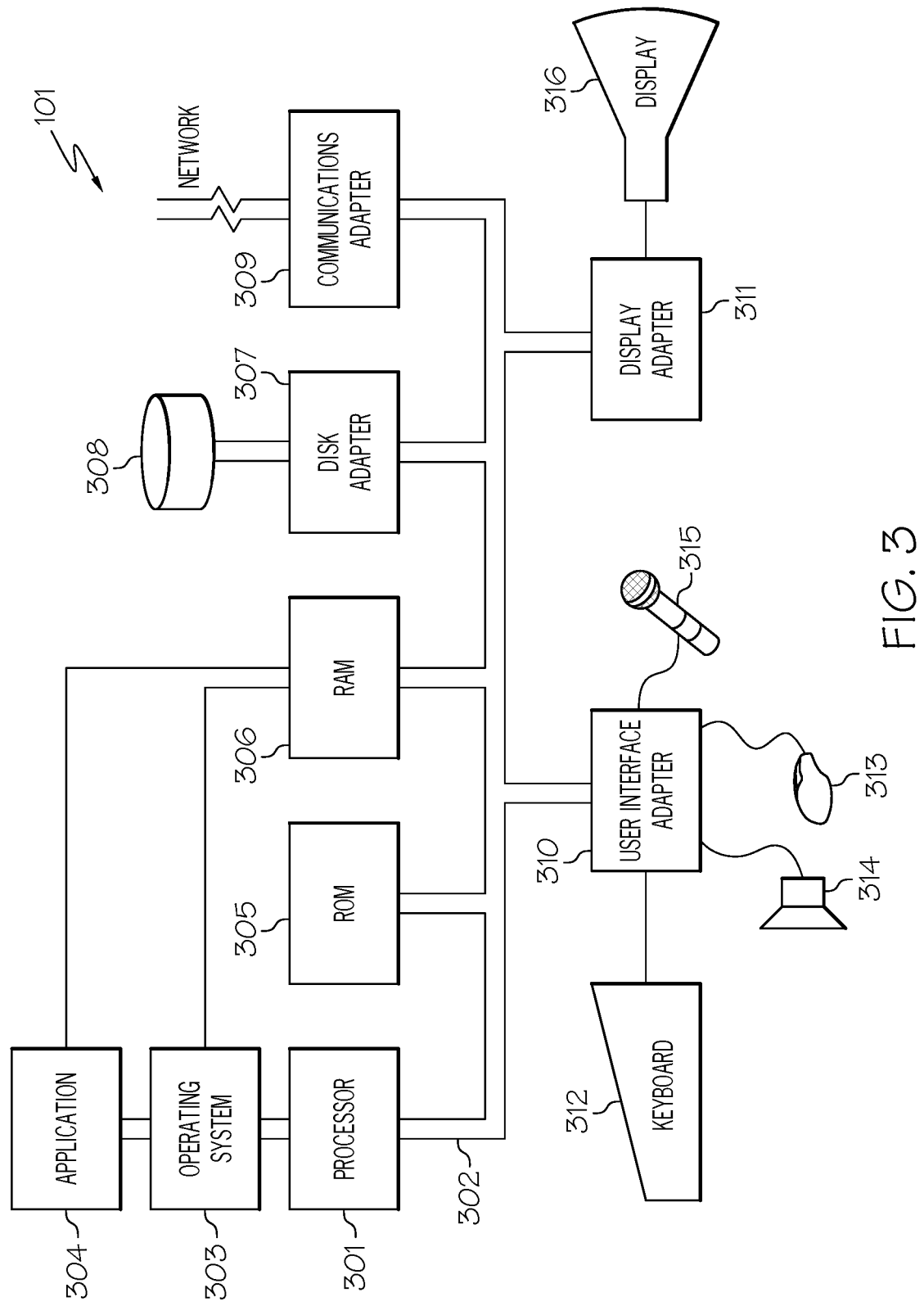
FIG. 3 illustrates an embodiment of the present invention of the hardware configuration of a computing device.

Referring now to FIG. 3, FIG. 3 illustrates an embodiment of the present invention of the hardware configuration of a computing device 101 which is representative of a hardware environment for practicing the present invention. Referring to FIG. 3, computing device 101 may have a processor 301 coupled to various other components by system bus 302. An operating system 303 may run on processor 301 and provide control and coordinate the functions of the various components of FIG. 3. An application 304 in accordance with the principles of the present invention may run in conjunction with operating system 303 and provide calls to operating system 303 where the calls implement the various functions or services to be performed by application 304. Application 304 may include, for example, a program for calculating the typing speed of user 102, a program for inferring the emotion or mood of user 102 based on the amount of pressure applied to the keys of the keyboard by user 102, a program for determining the emotion expressed by the sender based on measuring the voice characteristics of the sender; a program for measuring the social tone, a program for acquiring security preferences, including historical, to be provided to encryption selector 105; a program for acquiring biometric information, such as from smart wearable 106, of the sender during the creation of the message; and a program for acquiring biometric information, such as from smart wearable 106, of the receiver during the time of message transmission.

Referring again to FIG. 3, read-only memory ("ROM") 305 may be coupled to system bus 302 and include a basic input/output system ("BIOS") that controls certain basic functions of computing device 101. Random access memory ("RAM") 306 and disk adapter 307 may also be coupled to system bus 302. It should be noted that software components including operating system 303 and application 304 may be loaded into RAM 306, which may be computing device's 101 main memory for execution. Disk adapter 307 may be an integrated drive electronics ("IDE") adapter that communicates with a disk unit 308, e.g., disk drive.

Computing device 101 may further include a communications adapter 309 coupled to bus 302. Communications adapter 309 may interconnect bus 302 with an outside network (e.g., network 104) thereby allowing computing device 101 to communicate with other devices.

I/O devices may also be connected to computing device 101 via a user interface adapter 310 and a display adapter 311. Keyboard 312, mouse 313, speaker 314 and microphone 315 may all be interconnected to bus 302 through user interface adapter 310. A display monitor 316 may be connected to system bus 302 by display adapter 311. In this manner, a user is capable of inputting to computing device 101 through keyboard 312, mouse 313 or microphone 315 and receiving output from computing device 101 via display 316 or speaker 314. Other input mechanisms may be used to input data to computing device 101 that are not shown in FIG. 3, such as display 316 having touch-screen capability and keyboard 312 being a virtual keyboard. In another example, keyboard 312 may contain pressure sensors underneath the keys of keyboard 312 to detect the amount of pressure applied to the keys by user 102. Computing device 101 of FIG. 3 is not to be limited in scope to the elements depicted in FIG. 3 and may include fewer or additional elements than depicted in FIG. 3.

Figure 4:
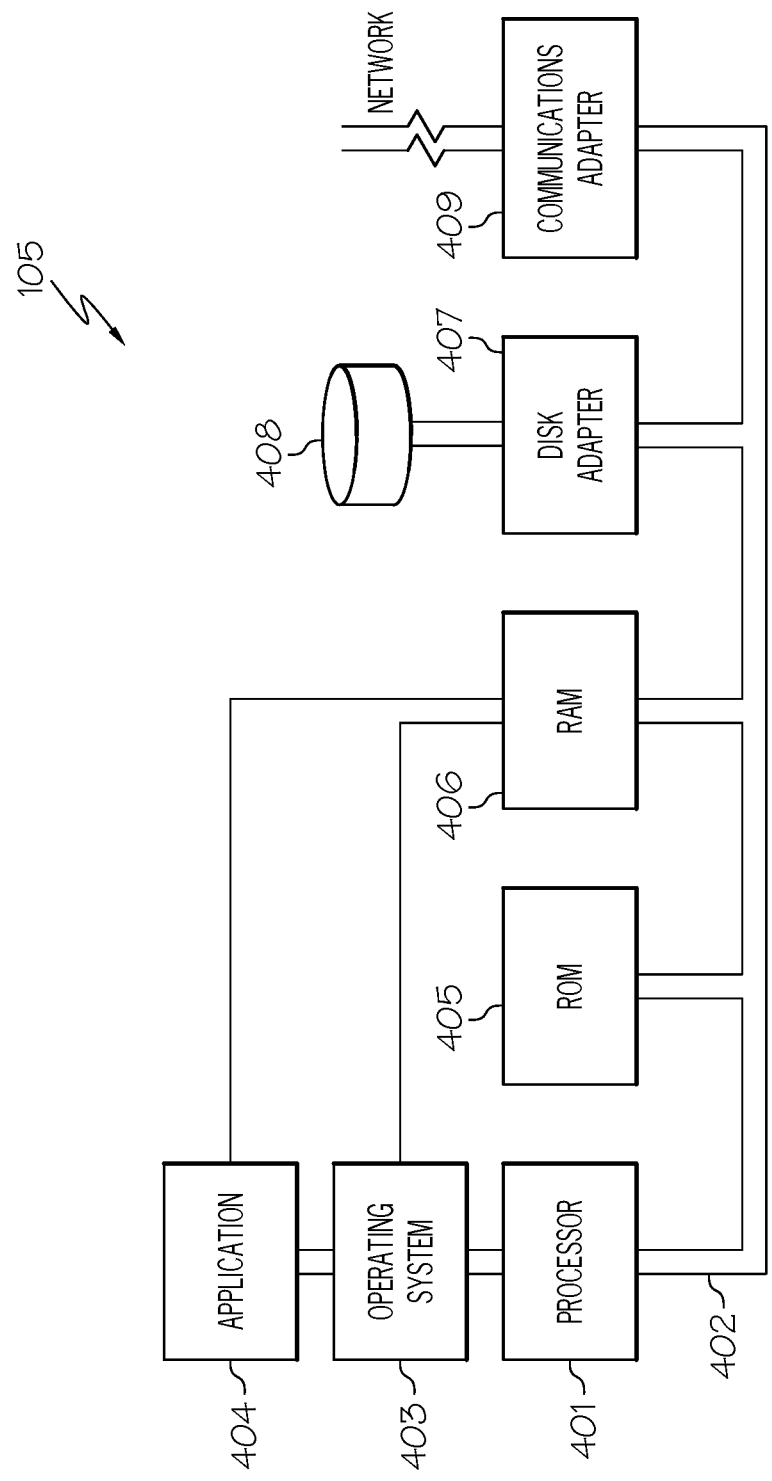
FIG. 4 illustrates an embodiment of the present invention of the hardware configuration of an encryption selector.

Referring now to FIG. 4, FIG. 4 illustrates a hardware configuration of encryption selector 105 (FIG. 1) which is representative of a hardware environment for practicing the present invention. Referring to FIG. 4, encryption selector 105 has a processor 401 coupled to various other components by system bus 402. An operating system 403 runs on processor 401 and provides control and coordinates the functions of the various components of FIG. 4. An application 404 in accordance with the principles of the present invention runs in conjunction with operating system 403 and provides calls to operating system 403 where the calls implement the various functions or services to be performed by application 404. Application 404 may include, for example, a program for securing data transmission by selecting an appropriate level of encryption to encapsulate the message as discussed below in association with FIG. 5.

Referring again to FIG. 4, read-only memory ("ROM") 405 is coupled to system bus 402 and includes a basic input/output system ("BIOS") that controls certain basic functions of encryption selector 105. Random access memory ("RAM") 406 and disk adapter 407 are also coupled to system bus 402. It should be noted that software components including operating system 403 and application 404 may be loaded into RAM 406, which may be encryption selector's 105 main memory for execution. Disk adapter 407 may be an integrated drive electronics ("IDE") adapter that communicates with a disk unit 408, e.g., disk drive. It is noted that the program for securing data transmission by selecting an appropriate level of encryption to encapsulate the message, as discussed below in association with FIG. 5, may reside in disk unit 408 or in application 404.

Encryption selector 105 may further include a communications adapter 409 coupled to bus 402. Communications adapter 409 interconnects bus 402 with an outside network (e.g., network 104 of FIG. 1) thereby allowing encryption selector 105 to communicate with other devices, such as computing devices 101 and social network server 103.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, there are various encryption algorithms that may be used, such as Twofish, Blowfish, Rivset-Shamir-Adleman (RSA), Triple Data Encryption Algorithm (DES) and Advanced Encryption Standard (AES). The particular type of encryption algorithm, including its strength (referring to the level of security achieved by the cipher), as well as the mode of transportation of the message, may be determined by the user, the system or based on the end-to-end communications. For example, the particular type of encryption algorithm, including its strength, as well as the mode of transportation of the message, may be determined based on the communications between the end nodes of the communication network where the sender of the message and the receiver of the message are located. However, the selection of the encryption algorithm as well as the selection of the strength of the encryption algorithm and the mode of transportation of the message using such means may not result in the appropriate level of encryption encapsulating the message thereby causing the message to be more easily accessible by unauthorized users resulting in the unauthorized access or loss of valuable data.

The embodiments of the present invention provide a means for selecting the appropriate level of encryption to encapsulate the message based on the cognitive states of the sender and receiver, the semantic meaning of the content of the message and/or the history of security preferences for the sender and receiver as discussed below in connection with FIG. 5.

Figure 5:
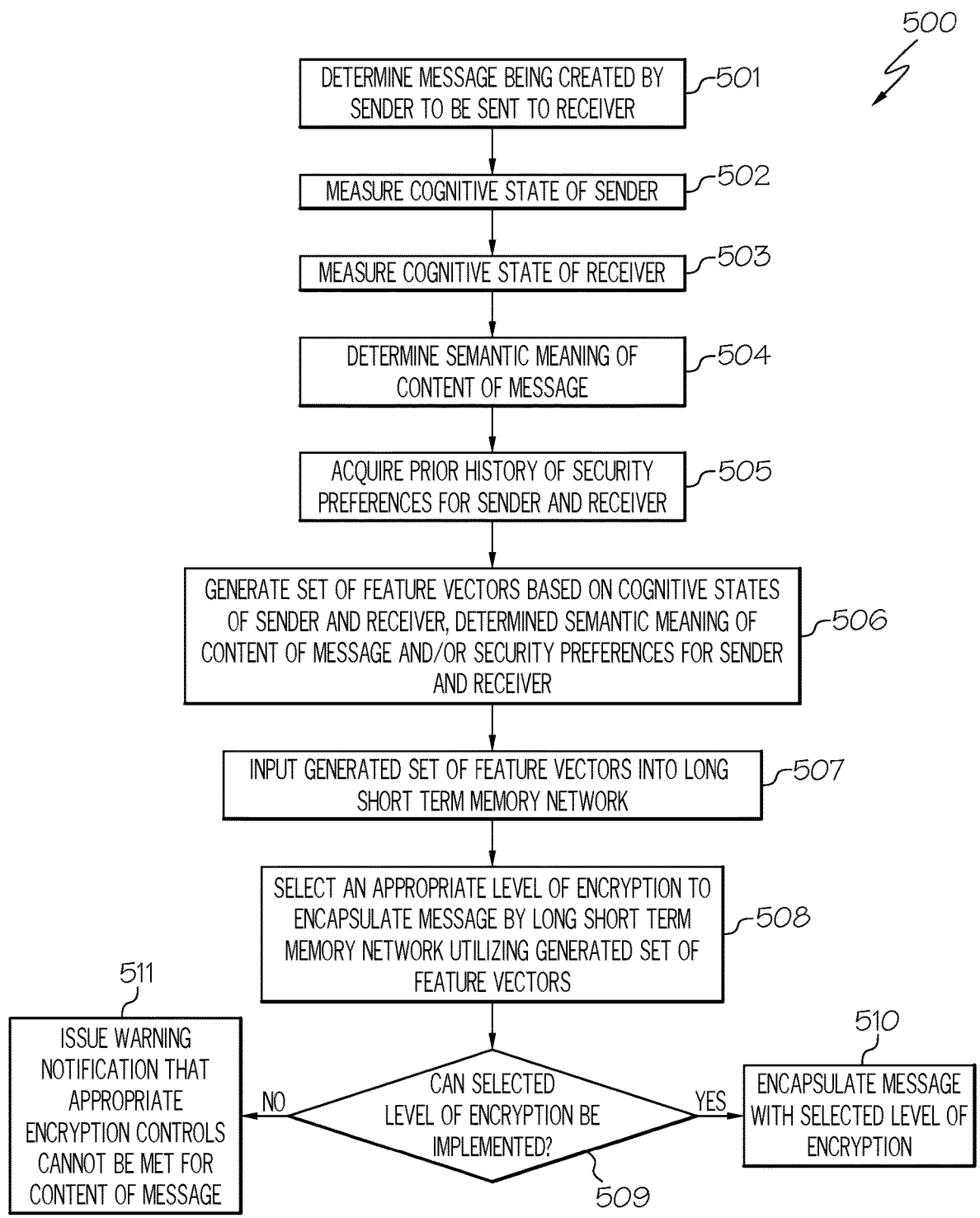
FIG. 5 is a flowchart of a method for securing data transmission in accordance with an embodiment of the present invention.

FIG. 5 is a flowchart of a method 500 for securing data transmission in accordance with an embodiment of the present invention.

Referring to FIG. 5, in conjunction with FIGS. 1-4, in step 501, encryption selector 105 determines that the message is being created by a sender (e.g., user 102A of computing device 101A) to be sent to a receiver (e.g., user 102B of computing device 101B). In one embodiment, encryption selector 105 determines that a message is being created based on detecting the sender selecting the "new e-mail" icon. In another embodiment, encryption selector 105 determines that a message is being created based on detecting the sender typing in a body of a message. In another embodiment, encryption selector 105 determines that a message is being created based on detecting the sender typing an e-mail address for a recipient/receiver, such as in the "To" field. In one embodiment, the receiver is determined by encryption selector 105 based on the e-mail address inputted by the sender in the message for the recipient/receiver.

In response to determining that a message is being created by the sender, in step 502, encryption selector 105 measures the cognitive state of the sender. As discussed above, in one embodiment, the cognitive state of the sender can be determined based on the role of the sender, measuring the input speed of typing the message being created, measuring amount of pressure applied to keys of a keyboard 312 as the sender is typing the message; measuring the voice characteristics of the sender in creating the message, measuring the social media tone and/or acquiring biometric information of the sender during the creation of the message.

In step 503, encryption selector 105 measures the cognitive state of the receiver. As discussed above, the cognitive state of the receiver can be determined based on the role of the receiver, measuring the social media tone and/or acquiring biometric information of the receiver during the time of message transmission.

In step 504, encryption selector 105 determines the semantic meaning of the content of the message. As discussed above, in one embodiment, encryption selector 105 determines the semantic meaning of the content of the message using natural language processing.

In step 505, encryption selector 105 acquires the prior history of security preferences for the sender and the receiver, such as from database 107.

In step 506, encryption selector 105 generates a set of feature vectors based on the cognitive states of the sender and receiver, the determined semantic meaning of the content of the message and/or the security preferences for the sender and receiver. In one embodiment, such information (e.g., cognitive states of the sender and receiver, the determined semantic meaning of the content of the message and/or the security preferences for the sender and receiver) are transformed into vector format (e.g., column vector) via vectorization. In one embodiment, such information is vectorized using machine learning, such as a machine learning model. For example, a machine learning model is used to map the cognitive states of the sender and receiver, the determined semantic meaning of the content of the message and/or the security preferences for the sender and receiver to vectors. For instance, the machine learning algorithm of Doc2vec or Word2vec could be used to vectorize such information into vector format. In one embodiment, the model is trained on a corpus to create embeddings for the information (e.g., cognitive states of the sender and receiver) as well as trained on the underlying natural language processing filtered tokens in the information (e.g., cognitive states of the sender and receiver). The vector representation of the information in the trained corpus is then stored with the model.

In one embodiment, these feature vectors include numeric values that represent the "features" of the information (i.e., the cognitive states of the sender and receiver, the determined semantic meaning of the content of the message and/or the security preferences for the sender and receiver).

In step 507, encryption selector 105 inputs the generated set of feature vectors into a long short term memory (LSTM) network generated by LSTM logic 108. In one embodiment, the LSTM neural network includes memory cells to recall a current status of encryption attacks and likelihood of losing data over particular modes of transportation.

Long short-term memory (LSTM) units (or blocks) are a building unit for layers of a recurrent neural network (RNN). A RNN composed of LSTM units is referred to herein as a "LSTM neural network." A common LSTM unit is composed of a cell, an input gate, an output gate and a forget gate. The cell is responsible for "remembering" values over arbitrary time intervals. Each of the three gates can be thought of as a "conventional" artificial neuron, as in a multi-layer (or feedforward) neural network: that is, they compute an activation (using an activation function) of a weighted sum. Intuitively, they can be thought as regulators of the flow of values that goes through the connections of the LSTM; hence the denotation "gate." There are connections between these gates and the cell.

The function of these gates is to safeguard the information by stopping or allowing the flow of it. The input gate determines how much of the information from the previous layer gets stored in the cell. The output layer determines how much of the next layer gets to know about the state of this cell. The forget gate determines whether the next layer does not get to know anything about the state of this cell. For example, if the network is learning a book and a new chapter begins, it may be necessary for the network to forget some characters from the previous chapter.

In one embodiment, LSTM logic 108 is configured to generate an LSTM neural network that outputs an appropriate level of encryption to encapsulate the message being created by the sender that includes the encryption algorithm, the encryption strength and the mode of transportation based on the feature vectors inputted to the LSTM neural network.

In one embodiment, the LSTM neural network includes one or more LSTM layers and an output layer. For each feature vector i in a given input sequence, the LSTM layers collectively process the feature vector to generate an LSTM output vector for the feature vector in accordance with current values of the parameters of the LSTM layers. The output layer then processes the LSTM output vector generated by the LSTM layers for the feature vector in order to generate the output vector for the feature vector.

In one embodiment, each LSTM layer includes one or more LSTM memory blocks and each LSTM memory block includes one or more cells that each include an input gate, a forget gate, and an output gate that allow the cell to store previous information generated by the cell as the current hidden state of the cell.

In one embodiment, the LSTM neural network can be trained in order to output an appropriate level of encryption for the parameters of the LSTM layers and of the output layer. That is, the LSTM neural network can, during a training process, be trained to predict an appropriate level of encryption from the feature values included in the feature vectors received by the LSTM neural network. In particular, during training, the LSTM neural network can be provided feature vectors for which the appropriate levels of encryption that should be predicted by the LSTM neural network are known in order to adjust the values of the parameters of the LSTM neural network.

In step 508, encryption selector 105, utilizing the long short term memory network, selects an appropriate level of encryption to encapsulate the message using the generated set of feature vectors as discussed above.

In step 509, a determination is made by encryption selector 105 as to whether the selected level of encryption to encapsulate the message can be implemented by the sending device (i.e., computing device 101 of the sender). As discussed above, in one embodiment, encryption selector 105 determines whether the selected level of encryption to encapsulate the message can be implemented is based, at least in part, on the encryption capability of the sending device (computing device 101 of sender). If the sending device (computing device 101 of the sender) cannot meet the selected level of encryption (i.e., cannot run the selected encryption algorithm with the selected encryption strength and transmit the message over the selected mode of transportation), then encryption selector 105 issues a warning notification indicating that appropriate encryption controls cannot be met for the content of the message. In this manner, a message that may be vulnerable to be accessible by an unauthorized user may be prevented thereby preventing the unauthorized access or loss of valuable data.

If the selected level of encryption to encapsulate the message can be implemented by the sending device, then, in step 510, encryption selector 105 encapsulates the message with the selected level of encryption. By selecting the level of encryption to encapsulate the message using the principles of the present invention, a more appropriate level of encryption is used to encapsulate the message thereby lessening the risk that the message will be accessed by an unauthorized user as well as lessening the risk of the loss of valuable data.

If, however, the selected level of encryption to encapsulate the message cannot be implemented by the sending device, then, in step 511, encryption selector 105 issues a warning notification that the appropriate encryption controls cannot be met for the content of the message.

The present invention improves the technology or technical field involving cryptography. As discussed above, there are various encryption algorithms that may be used, such as Twofish, Blowfish, Rivset-Shamir-Adleman (RSA), Triple Data Encryption Algorithm (DES) and Advanced Encryption Standard (AES). The particular type of encryption algorithm, including its strength (referring to the level of security achieved by the cipher), as well as the mode of transportation of the message, may be determined by the user, the system or based on the end-to-end communications. For example, the particular type of encryption algorithm, including its strength, as well as the mode of transportation of the message, may be determined based on the communications between the end nodes of the communication network where the sender of the message and the receiver of the message are located. However, the selection of the encryption algorithm as well as the selection of the strength of the encryption algorithm and the mode of transportation of the message using such means may not result in the appropriate level of encryption encapsulating the message thereby causing the message to be more easily accessible by unauthorized users resulting in the unauthorized access or loss of valuable data.

Such a problem is a technical problem since it involves computing technology.

The present invention addresses such a technical problem by improving the technology of cryptography by selecting the appropriate level of encryption to encapsulate the message based on the cognitive states of the sender and receiver, the semantic meaning of the content of the message and/or the history of security preferences for the sender and receiver. As discussed above, the cognitive states of the sender and receiver may be measured. The cognitive state of the sender may be determined based on the role of the sender, measuring the input speed of typing the message being created, measuring the pressure applied to the keys as the sender is typing the message, measuring the voice characteristics of the sender in creating the message, measuring the social tone and/or acquiring biometric information of the sender during the creation of the message. The cognitive state of the receiver may be determined based on the role of the receiver, measuring the social media tone and/or acquiring biometric information of the receiver during the time of message transmission. Furthermore, the semantic meaning of the content of the message may be determined, such as via natural language processing. Additionally, the prior historical security preferences for the sender and receiver may be acquired. A set of feature vectors for the sender and receiver is generated based on the cognitive states of the sender and receiver, the semantic meaning of the content of the message and/or the prior history of security preferences for the sender and receiver. The feature vectors are inputted into a long short term memory network, which selects an appropriate level of encryption to encapsulate the message utilizing the generated set of feature vectors. The appropriate level of encryption refers to the encryption algorithm, the encryption strength and the mode of transportation in sending the message. The message is then encapsulated using the selected level of encryption if the computing device of the sender is capable of implementing the level of encryption. In this manner, by using an appropriate level of encryption, the message is less likely to be accessible by unauthorized users thereby reducing the likelihood of unauthorized access or loss of valuable data.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for securing data transmission, the method comprising:
   determining that a message is being created to be sent from a sender to a receiver;
   measuring a cognitive state of said sender of said message;
   measuring a cognitive state of said receiver of said message;
   generating a set of feature vectors for said sender and said receiver based on said cognitive states of said sender and said receiver;
   inputting said generated set of feature vectors into a long short term memory network;
   selecting a level of encryption to encapsulate said message by said long short term memory network utilizing said generated set of feature vectors, wherein said selected level of encryption comprises an encryption strength, an algorithm and a mode of transportation; and
   encapsulating said message using said selected level of encryption in response to said selected level of encryption to encapsulate said message being capable of being implemented by a computing device of said sender.

2. The method as recited in claim 1, wherein said cognitive state of said sender is measured based on performing one or more of the following:
   acquiring a role of said sender of said message;
   measuring an input speed of typing said message;
   measuring amount of pressure applied to keys of a keyboard as said sender is typing said message;
   measuring voice characteristics of said sender of said message in creating said message;
   measuring social media tone; and
   acquiring biometric information of said sender during creation of said message.

3. The method as recited in claim 1, wherein said cognitive state of said receiver is based on performing one or more of the following:
  acquiring a role of said receiver of said message;
  measuring social media tone; and
  acquiring biometric information of said receiver during time of message transmission.

4. The method as recited in claim 1 further comprising:
  determining a semantic meaning of content of said message; and
  selecting by said long short term memory network said encryption strength, said algorithm and said mode of transportation utilizing said generated set of feature vectors and said determined semantic meaning of said content of said message.

5. The method as recited in claim 1 further comprising:
  acquiring prior history of security preferences for said sender and said receiver; and
  selecting by said long short term memory network said encryption strength, said algorithm and said mode of transportation utilizing said generated set of feature vectors and said security preferences for said sender and said receiver.

6. The method as recited in claim 1 further comprising:
  acquiring an encryption capability of said computing device of said sender; and
  issuing a warning notification that appropriate encryption controls cannot be met for content of said message in response to determining that said selected level of encryption cannot be met for said content of said message based on said acquired encryption capability of said computing device of said sender.

7. The method as recited in claim 1, wherein said long short term memory network comprises memory cells to recall a current status of encryption attacks and likelihood of losing data over particular modes of transportation.

8. A computer program product for securing data transmission, the computer program product comprising a computer readable storage medium having program code embodied therewith, the program code comprising the programming instructions for:
  determining that a message is being created to be sent from a sender to a receiver;
  measuring a cognitive state of said sender of said message;
  measuring a cognitive state of said receiver of said message;
  generating a set of feature vectors for said sender and said receiver based on said cognitive states of said sender and said receiver;
  inputting said generated set of feature vectors into a long short term memory network;
  selecting a level of encryption to encapsulate said message by said long short term memory network utilizing said generated set of feature vectors, wherein said selected level of encryption comprises an encryption strength, an algorithm and a mode of transportation; and
  encapsulating said message using said selected level of encryption in response to said selected level of encryption to encapsulate said message being capable of being implemented by a computing device of said sender.

9. The computer program product as recited in claim 8, wherein said cognitive state of said sender is measured based on performing one or more of the following:
  acquiring a role of said sender of said message;
  measuring an input speed of typing said message;
  measuring amount of pressure applied to keys of a keyboard as said sender is typing said message;
  measuring voice characteristics of said sender of said message in creating said message;
  measuring social media tone; and
  acquiring biometric information of said sender during creation of said message.

10. The computer program product as recited in claim 8, wherein said cognitive state of said receiver is based on performing one or more of the following:
  acquiring a role of said receiver of said message;
  measuring social media tone; and
  acquiring biometric information of said receiver during time of message transmission.

11. The computer program product as recited in claim 8, wherein the program code further comprises the programming instructions for:
  determining a semantic meaning of content of said message; and
  selecting by said long short term memory network said encryption strength, said algorithm and said mode of transportation utilizing said generated set of feature vectors and said determined semantic meaning of said content of said message.

12. The computer program product as recited in claim 8, wherein the program code further comprises the programming instructions for:
  acquiring prior history of security preferences for said sender and said receiver; and
  selecting by said long short term memory network said encryption strength, said algorithm and said mode of transportation utilizing said generated set of feature vectors and said security preferences for said sender and said receiver.

13. The computer program product as recited in claim 8, wherein the program code further comprises the programming instructions for:
  acquiring an encryption capability of said computing device of said sender; and
  issuing a warning notification that appropriate encryption controls cannot be met for content of said message in response to determining that said selected level of encryption cannot be met for said content of said message based on said acquired encryption capability of said computing device of said sender.

14. The computer program product as recited in claim 8, wherein said long short term memory network comprises memory cells to recall a current status of encryption attacks and likelihood of losing data over particular modes of transportation.

15. A system, comprising:
  a memory for storing a computer program for securing data transmission; and
  a processor connected to said memory, wherein said processor is configured to execute the program instructions of the computer program comprising:
    determining that a message is being created to be sent from a sender to a receiver;
    measuring a cognitive state of said sender of said message;
    measuring a cognitive state of said receiver of said message;
    generating a set of feature vectors for said sender and said receiver based on said cognitive states of said sender and said receiver;
    inputting said generated set of feature vectors into a long short term memory network;

selecting a level of encryption to encapsulate said message by said long short term memory network utilizing said generated set of feature vectors, wherein said selected level of encryption comprises an encryption strength, an algorithm and a mode of transportation; and encapsulating said message using said selected level of encryption in response to said selected level of encryption to encapsulate said message being capable of being implemented by a computing device of said sender.

16. The system as recited in claim 15, wherein said cognitive state of said sender is measured based on performing one or more of the following:

acquiring a role of said sender of said message;

measuring an input speed of typing said message;

measuring amount of pressure applied to keys of a keyboard as said sender is typing said message;

measuring voice characteristics of said sender of said message in creating said message;

measuring social media tone; and acquiring biometric information of said sender during creation of said message.

17. The system as recited in claim 15, wherein said cognitive state of said receiver is based on performing one or more of the following:

acquiring a role of said receiver of said message;

measuring social media tone; and acquiring biometric information of said receiver during time of message transmission.

18. The system as recited in claim 15, wherein the program instructions of the computer program further comprise:

determining a semantic meaning of content of said message; and selecting by said long short term memory network said encryption strength, said algorithm and said mode of transportation utilizing said generated set of feature vectors and said determined semantic meaning of said content of said message.

19. The system as recited in claim 15, wherein the program instructions of the computer program further comprise:

acquiring prior history of security preferences for said sender and said receiver; and selecting by said long short term memory network said encryption strength, said algorithm and said mode of transportation utilizing said generated set of feature vectors and said security preferences for said sender and said receiver.

20. The system as recited in claim 15, wherein the program instructions of the computer program further comprise:

acquiring an encryption capability of said computing device of said sender; and issuing a warning notification that appropriate encryption controls cannot be met for content of said message in response to determining that said selected level of encryption cannot be met for said content of said message based on said acquired encryption capability of said computing device of said sender.

* * * * *